US008798475B2

(12) United States Patent
Rope

(10) Patent No.: US 8,798,475 B2
(45) Date of Patent: Aug. 5, 2014

(54) DYNAMIC MEMORY ALLOCATION IN AN OPTICAL TRANSCEIVER

(75) Inventor: Todd Rope, Glendale, CA (US)

(73) Assignee: Source Photonics, Inc., Chatsworth, CA (US)

( * ) Notice: Subject to any disclaimer, the term of this patent is extended or adjusted under 35 U.S.C. 154(b) by 391 days.

(21) Appl. No.: 13/070,358

(22) Filed: Mar. 23, 2011

(65) Prior Publication Data
US 2012/0243875 A1 Sep. 27, 2012

(51) Int. Cl.
*H04B 10/12* (2006.01)
*H04B 10/00* (2013.01)

(52) U.S. Cl.
USPC ............................... 398/135; 398/138

(58) Field of Classification Search
USPC .................................. 398/135–139
See application file for complete search history.

(56) References Cited

U.S. PATENT DOCUMENTS

| | | | |
|---|---|---|---|
| 6,952,531 B2 | 10/2005 | Aronson et al. | |
| 7,079,775 B2 | 7/2006 | Aronson et al. | |
| 7,200,336 B2 | 4/2007 | Yu et al. | |
| 7,650,077 B2 | 1/2010 | Yu et al. | |
| 2004/0100687 A1* | 5/2004 | Aronson et al. | 359/341.1 |
| 2004/0190539 A1* | 9/2004 | Moriwaki | 370/419 |
| 2006/0069898 A1* | 3/2006 | Patel et al. | 711/171 |
| 2007/0166041 A1* | 7/2007 | Le et al. | 398/135 |
| 2009/0148160 A1* | 6/2009 | Lim et al. | 398/43 |
| 2009/0168858 A1* | 7/2009 | Luo | 375/224 |
| 2009/0240945 A1* | 9/2009 | Aronson | 713/176 |
| 2009/0317073 A1* | 12/2009 | Hotchkiss et al. | 398/1 |
| 2012/0093504 A1* | 4/2012 | Aronson et al. | 398/38 |
| 2013/0243439 A1* | 9/2013 | Ito | 398/135 |

OTHER PUBLICATIONS

Todd Rope; "Operational Status Flag Generation in an Optical Transceiver"; U.S. Appl. No. 13/075,092, filed Mar. 29, 2011.

* cited by examiner

*Primary Examiner* — Daniel Dobson
(74) *Attorney, Agent, or Firm* — Murabito Hao & Barnes LLP; Andrew D. Fortney

(57) ABSTRACT

Methods, algorithms, architectures, circuits, and/or systems for dynamically allocating memory for storing parametric data in optical transceivers are disclosed. The optical transceiver can include an optical receiver configured to receive optical data; an optical transmitter configured to transmit optical data; a microprocessor configured to access data for each of a plurality of parameters that are related to operation of at least one of the optical receiver and the optical transmitter; one or more memories configured to store the data at a plurality of locations that are dynamically allocated by the microprocessor; and an interface configured to receive a request for data for one or more of the parameters from a host and provide the data in response to the request. In the present disclosure, the host is unaware of the locations at which the parametric data are stored.

24 Claims, 6 Drawing Sheets

DYNAMIC MEMORY ALLOCATION IN AN OPTICAL TRANSCEIVER

FIELD OF THE INVENTION

The present invention generally relates to the field of optical transceivers. More specifically, embodiments of the present invention pertain to memory allocation for data related to operation(s) of an optical transceiver.

DISCUSSION OF THE BACKGROUND

Optical transceivers send and receive data in an optical form over an optical link, such as a fiber-optic link. An optical transmitter can include laser driver circuitry to drive a diode, such as a light-emitting diode (LED), to create optical pulses on the fiber-optic link from received electronic signals. An optical receiver can include a photosensitive diode to receive optical signals, which are then converted into electronic signals. Thus, an optical transceiver converts (i) optical signals into analog and/or digital electronic signals and (ii) electronic signals into optical signals.

In order to determine if the optical transceiver is functioning correctly, various operational parameters are monitored. In conventional approaches, these monitored parameters are stored on the optical transceiver in a memory-mapped fashion. In this case, a host processor or circuit board transmits a memory address to the transceiver in order to access a monitored parameter stored at that memory address in the transceiver. However, this approach limits transceiver usage for other purposes by statically allocating certain memory portions strictly for such parameter storage.

SUMMARY OF THE INVENTION

Embodiments of the present invention relate to methods, algorithms, architectures, circuits, and/or systems for dynamically allocating memory for parametric data in optical transceivers.

In one embodiment, an optical transceiver can include (i) an optical receiver configured to receive optical data; (ii) an optical transmitter configured to transmit optical data; (iii) a microprocessor configured to access data for each of a plurality of parameters that are related to operation of at least one of the optical receiver and the optical transmitter; (iv) one or more memories configured to store the data at a plurality of locations that are dynamically allocated by the microprocessor; and (v) an interface configured to (a) receive a request for data for one or more of the parameters from a host and (b) provide the data in response to the request, where the host is unaware of the locations in the one or more memories at which the data are stored. This invention further relates to an optical triplexer that includes such an optical transceiver.

In another embodiment, a method of controlling access to parametric data in an optical transceiver can include (i) scanning one or more memories in the optical transceiver to determine available data storage locations therein; (ii) dynamically allocating a location from the available data storage locations for storage of the parametric data, where the parametric data is for an operational parameter of the optical transceiver; and (iii) storing the parametric data in the one or more memories at the location.

In yet another embodiment, a method of accessing parametric data in an optical transceiver can include (i) receiving a request for the parametric data from a host, where the parametric data is for an operational parameter of the optical transceiver; (ii) translating an identifier from the request into a location in one or more memories in the optical transceiver at which the parametric data is stored, where the host is unaware of the location; and (iii) sending the requested parametric data to the host.

In a further embodiment, a system for accessing parametric data can include (i) an optical transceiver configured to transmit and receive optical data, where the optical transceiver includes a microprocessor and a memory, the microprocessor being configured to access the parametric data, and the memory being configured to store the parametric data at one or more locations that are dynamically allocated by the microprocessor; and (ii) a host configured to provide a request to the optical transceiver for the parametric data and receive the parametric data from the optical transceiver in response to the request, where the parametric data is related to one or more operations of the optical transceiver, and the host is unaware of the one or more locations in the one or more memories at which the parametric data are stored.

Embodiments of the present invention advantageously provide an approach that dynamically allocates memory for usage in storing parametric data in an optical transceiver. Embodiments of the present invention can allow for increased flexibility in memory allocation (as well as in the amounts and types of parametric data collected, stored and processed) and in overall transceiver system design. These and other advantages of the present invention will become readily apparent from the detailed description of preferred embodiments below.

DETAILED DESCRIPTION OF THE PREFERRED EMBODIMENTS

Figure 1:
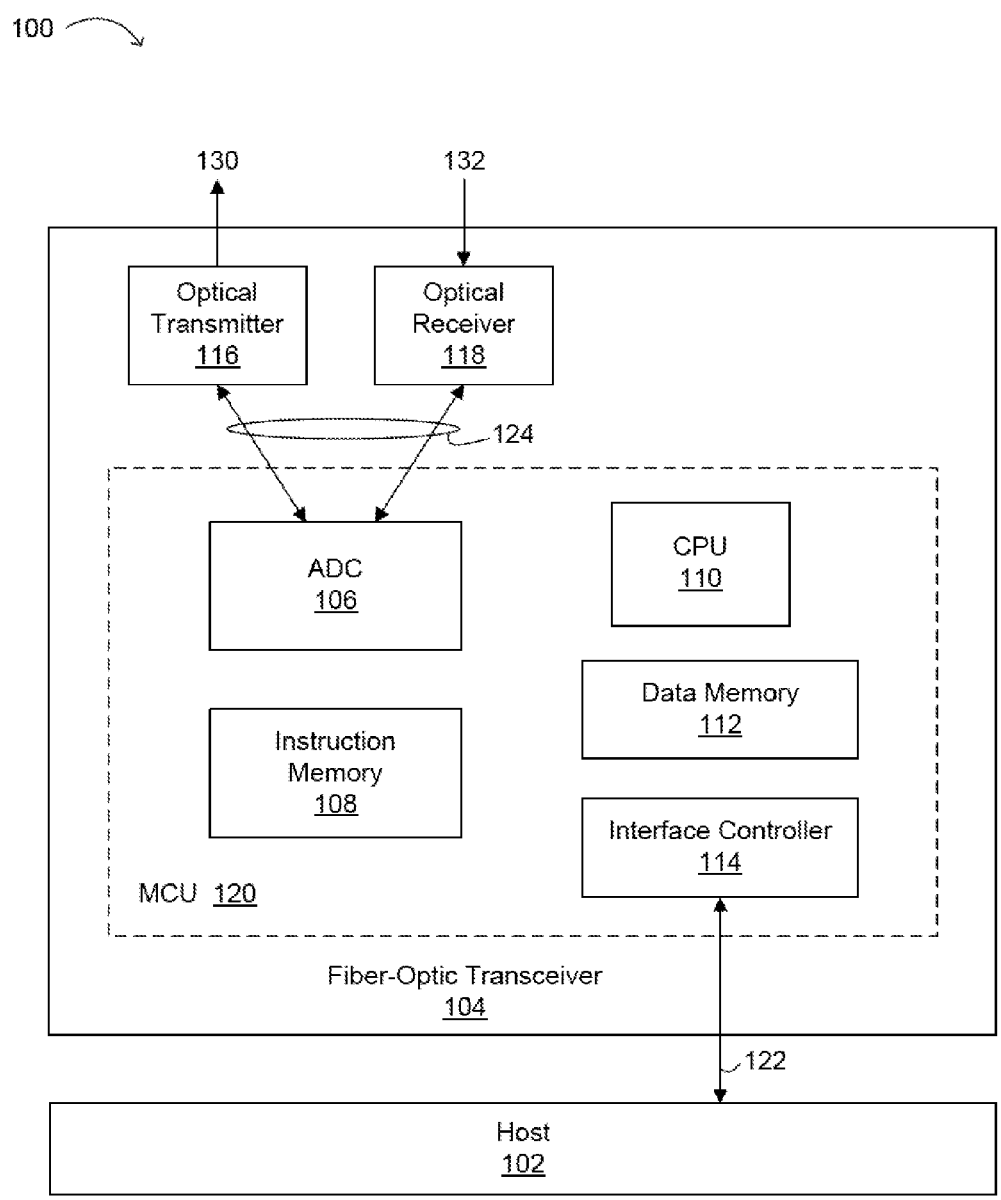
FIG. 1 is a block diagram showing an exemplary optical transceiver system in accordance with embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "time," "rate," "period" and "frequency" are, in general, interchangeable and may be used interchangeably herein, but are generally given their art-recognized meanings. Also, for convenience and simplicity, the terms "data," "data stream," "bits," and "information" may be used interchangeably, as may the terms "connected to," "coupled to," and "in communication with" (which may refer to direct or indirect connections, couplings, or communications), but these terms are generally given their art-recognized meanings herein.

Embodiments of the present invention advantageously provide an approach that dynamically allocates memory for usage in storing parametric data in an optical transceiver. Embodiments of the present invention can allow for increased flexibility in memory allocation, as well as in the amounts and/or types of parametric data collected, stored, and processed, and in overall transceiver system design. The invention, in its various aspects, will be explained in greater detail below with regard to exemplary embodiments.

According to various embodiments of the present invention, an architecture or circuit for memory allocation, suitable for use in optical transceiver systems, is provided. In general, an optical transceiver in accordance with particular embodiments includes a memory with a plurality of locations that can be dynamically allocated by a microprocessor or microcontroller to store data from monitored parameters related to transceiver operation. This approach can allow a fiber optic transceiver to store memory in a dynamic fashion, either at link-time or run-time, to provide increased flexibility in the design of the system, relative to conventional approaches.

Exemplary Parametric Data Access System

In one example, a system for accessing parametric data can include (i) an optical transceiver configured to transmit and receive optical data, where the optical transceiver includes a microprocessor and a memory, the microprocessor being configured to access the parametric data, and the memory being configured to store the parametric data at one or more locations that are dynamically allocated by the microprocessor; and (ii) a host configured to provide a request to the optical transceiver for the parametric data and receive the parametric data from the optical transceiver in response to the request, where the parametric data is related to one or more operations of the optical transceiver, and the host is unaware of the one or more locations in the one or more memories at which the parametric data are stored.

FIG. 1 illustrates an exemplary optical transceiver system 100 in accordance with embodiments of the present invention. Optical transceiver system 100 can include optical transceiver 104 (e.g., a fiber-optic transceiver) and host 102. Host 102 can be a host processor, circuit board, stand-alone optical network device (e.g., a repeater, optical switch, set-top box, etc.) or any other component or device including a suitable controller or processor. Host 102 can interface with optical transceiver 104 via communications interface 122. For example, communications interface 122 can be a serial interface. Alternatively, communications interface 122 can be a parallel interface including a plurality of bit signals.

Optical transceiver 104 can include microcontroller (MCU) 120, optical transmitter 116, and optical receiver 118. For example, optical transmitter 116 can include a light-emitting diode (LED), laser diode, or any other suitable device for generating light pulses (e.g., optical signals) over optical signal medium 130 (e.g., a fiber-optic link). Optical receiver 118 can be a photodiode or other device configured to receive an optical signal 132 and convert the received optical signal into an electrical signal. Optical signals 130 and 132 may be separate optical links, or may be part of a common fiber-optic link or other suitable optical connection (e.g., an optical waveguide, multi-mode fiber[s] [MMF], single-mode fiber[s] [SMF], etc.). In addition, an optical duplexer, an optical triplexer, or other multiple transceiver configurations can be formed by combining two or more optical transceivers 104 or components thereof (e.g., two or more optoelectronic receivers with a single opt electric transmitter).

Analog electronic signals 124 are transmitted between analog-to-digital converter (ADC) 106 and optical transmitter 116, and between optical receiver 118 and ADC 106. Analog electronic signals 124 can accommodate optical signal information in an electronic form. ADC 106 can then convert these electronic signals from an analog form into a digital form to allow for digital processing within MCU 120. MCU 120 can further include interface controller 114, central processing unit (CPU) or microprocessor 110, instruction memory 108, and data memory 112. MCU 120 generally receives and transmits communications with host 102 over host communications interface 122.

In certain embodiments, instruction memory 108 is a non-volatile memory, and data memory 112 is a volatile memory. However, instruction memory 108 can alternatively be a volatile memory, or may contain portions of both non-volatile and volatile memories. Also, data memory 108 can alternatively comprise a non-volatile memory, or may contain portions of both volatile and non-volatile memories. Examples of non-volatile memories include electrically erasable programmable read-only memory (EEPROM), Flash EEPROM, magnetoresistive RAM (MRAM), laser programmable memories (e.g., fuse-based), or other suitable type of ROM or non-volatile storage device. Examples of volatile memories include static random-access memory (SRAM), dynamic RAM (DRAM), or other suitable type of RAM or volatile storage element that maintains a stored state when power is applied.

In addition, while data memory 112 is generally described herein as storing parametric data related to transceiver operation(s), such data can alternatively or additionally be stored in instruction memory 108. For example, considerations of performance, memory availability and operational efficiency can be used to determine whether parametric data is stored in instruction memory 108 and/or data memory 112. In some applications, instructions can be stored in RAM or other data memory for performance reasons. Further, various data memory (e.g., parametric data) can be stored in ROM or other non-volatile memory for efficiency reasons, such as when the stored data does not change or changes relatively infrequently.

Exemplary Optical Transceiver

In one example, an optical transceiver can include (i) an optical receiver configured to receive optical data; (ii) an optical transmitter configured to transmit optical data; (iii) a microprocessor configured to access data for each of a plurality of parameters that are related to operation of at least one of the optical receiver and the optical transmitter; (iv) one or more memories configured to store the data at a plurality of locations that are dynamically allocated by the microprocessor; and (v) an interface configured to (a) receive a request for data for one or more of the parameters from a host and (b) provide the data in response to the request, where the host is unaware of the locations in the one or more memories at which the data are stored.

Figure 2:
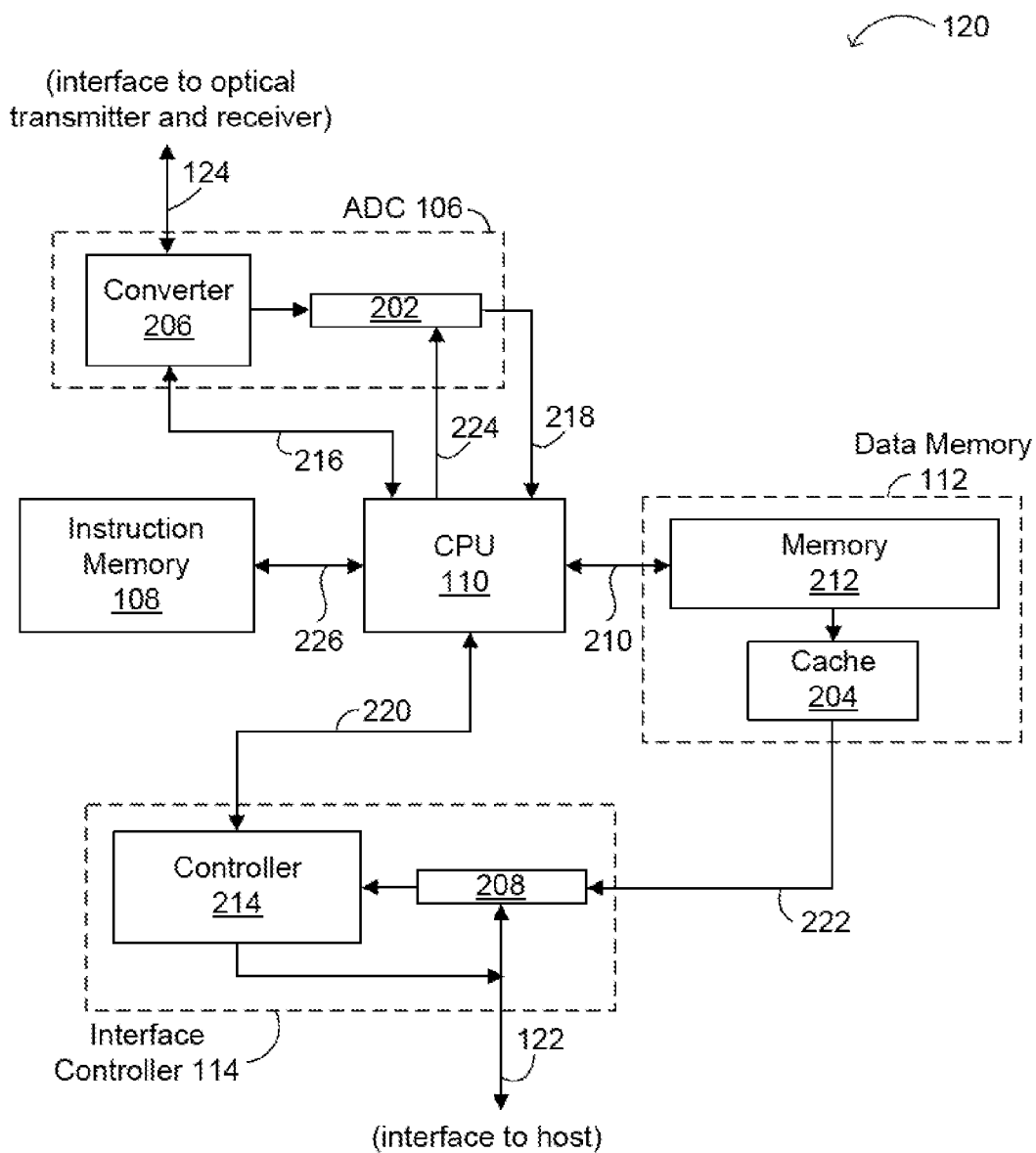
FIG. 2 is a block diagram showing an exemplary microcontroller for an optical transceiver in accordance with embodiments of the present invention.

FIG. 2 illustrates an exemplary microcontroller 120 for an optical transceiver in accordance with embodiments of the present invention. ADC 106 can interface with an optical transmitter and/or an optical receiver (not shown) via optical information signals 124. CPU 110 may utilize control signal 216 for interacting with ADC 106 via converter 206. Register 202 can store and provide an output for ADC 106 by capturing output data from converter 206. In some cases, a demultiplexer (not shown) or a bank of registers may be used in addition to, or in place of, register 202 to support a higher rate of data output from converter 206. For example, data can be output from converter 206 into a bank of registers in a sequential or round-robin fashion. In the example of a demultiplexer, data output from converter 206 may be sent via the various demultiplexer outputs to CPU 110.

For example, register 202 can include parametric data related to operation(s) of optical transmitter 116 and/or optical receiver 118 (see, e.g., FIG. 1). As discussed above, register 202, while shown in FIG. 2 as a single register, can also be implemented as a bank of registers, or an otherwise larger memory portion for capturing larger amounts of data from ADC 106. For example, various parametric data can be captured in a serial fashion or in parallel. As a result, although the output of converter 206 is generally multi-bit (e.g., n bits wide, where n is a integer of at least 2, such as 4, 6, 8, 10, 12, 16, 32, etc.), the data output by register 202 may be serial or parallel. In order for CPU 110 to retrieve this parametric data, data access control signal 224 can be activated by CPU 110. In response to control signal 224, data from register 202 can be output via ADC output signal/bus 218.

Parametric data can be provided to register 202 and/or accessed by CPU 110 (via ADC output signal 218) at a predetermined frequency and/or on-demand. For example, converter 206 can periodically update register 202 during normal operation of ADC 106 and/or CPU 110. If data access control signal 224 is held in an activated state, CPU 110 can receive the periodically updated data from register 202 via ADC output signal 218 at this same frequency. For example, this parametric update rate can vary from about 1 ms to about 100 ms (e.g., about 50 ms), or at any other suitable update rate within this range or outside this rang, depending on the operating frequencies of ADC 106 and CPU 110 and the design of register 202 (e.g., whether it is or is part of a bank of registers, whether it includes a demultiplexer, etc.). Certain embodiments may also support a plurality of parametric update rates (e.g., different update rates for different parameters), including variable update rates for one or more of the parameters for which data are periodically updated.

In some applications, this parametric data update rate can be programmed by a user. For example, a variety of supported update rates can be presented to a user for selection via a graphical user interface (GUI). Also, while a given parametric data update rate can be selected or otherwise fixed, parametric data can also be updated upon demand. In some cases, an option (e.g., a user option) can be employed whereby the parametric data is designated to be determined periodically or only updated upon demand. In other cases, on-demand parametric data updating can essentially act as an override to an otherwise periodic data update mode. Thus, parametric data can be updated via register 202 and ADC output signal 218 periodically and/or upon demand, and these data update modes may depend on particular applications, certain parameters, as well as customer/user configurations.

CPU 110 can retrieve (e.g., fetch and/or pre-fetch) instructions from instruction memory 108 via interface signals 226. CPU 110 can also interface with data memory 112 via bus(es) 210. For example, parametric data received from ADC output 218 can be provided on bus(es) 210 to data memory 112 for storage. Bus(es) 210 may be a serial bus or multi-bit bus configured for serial and/or parallel communication, and may support unidirectional and/or bidirectional signaling. CPU 110 can also send control signals on bus(es) 210 to control scanning of data memory 112 to determine available memory locations for subsequent, or substantially simultaneous, storage of parametric data retrieved from register 202. Such scanning of data memory 112 can also be performed in periodic fashion and/or in response to on-demand requests, such as requests from host 102 to retrieve parametric data. For example, data memory 112 can be scanned for available locations at substantially a same rate that ADC output signal 218 is updated, or at a higher or lower rate. Further, an on-demand parametric data update can also involve or include scanning data memory 112 for available locations.

In one example, data memory 112 can include memory portion 212 and cache portion 204. Cache portion 204 can be a smaller and faster memory (e.g., have a smaller capacity/ density and be configured to operate at a higher frequency) relative to the remaining portion of data memory 112. Memory portion 212 and/or cache portion 204 can also include a variety of registers that can be allocated for storage of parametric data, the locations of which can be managed by CPU 110. Further, memory portion 212 and cache portion 204 can be subdivided into any number of blocks or other arrangements (e.g., different chips) of memory. In this exemplary arrangement, cache portion 204 can provide data memory output 222 to interface controller 114. For example, cache portion 204 may store copies of certain parametric data that is most likely to be requested by host 102. In one embodiment, a user may configure a predetermined number of parameters to also be stored in cache portion 204 along with memory portion 212 so that such requested parametric data can be provided at a faster rate to host 102. Alternatively, copies of parametric data in memory portion 212 can be made in cache portion 204 based on other factors, such as parametric data that is most recently written to or stored in memory portion 212, or parametric data that is most recently requested by host 102. In this fashion, cache portion 204 may effectively be used to decrease parametric data access time to service a request from host 102.

In certain embodiments, parametric data can be accessed and stored in data memory 112. CPU 110 can scan data memory 112 in order to determine available locations for storing the parametric data. Appropriate available locations can thus be allocated for parametric data storage. As discussed above, such allocating, as well as accessing and storing of the parametric data, can be performed periodically and/or upon demand. Once parametric data has been stored in data memory 112, this data is available for access via host communications interface 122. In addition, CPU 110 can manage parametric data storage locations by correlating an identifier from a host request for parametric data to a pointer register linked to the appropriate storage location in data memory 112.

In certain embodiments, host 102 is not aware of the location at which parametric data is stored in data memory 112. Thus, MCU 120 can maintain parametric data storage information (e.g., locations in data memory 112 where certain parametric data are stored) while not providing this information outside of the optical transceiver (e.g., fiber-optic transceiver 104 in FIG. 1) itself. Nonetheless, host 102 can still request this parametric data from the optical transceiver.

For example, a request for parametric data can be received by interface controller 114 via host communications interface 122. The request for parametric data from host 102 can include an identifier of a parameter for which corresponding data are sought. In the present disclosure, for compatibility with conventional or pre-existing (e.g., "legacy") hosts, the request sent by the host may include address information, but the information identifying the parameter for which corresponding data are sought may or may not include such address information. Register 208 can store the incoming identifier and the outgoing parametric data. Alternatively, separate registers can be used to store incoming identifier information and outgoing parametric data. Controller 214 (e.g., a microcontroller, programmable logic device [PLD], complex PLD [CPLD], field-programmable gate array [FPGA], etc.) within interface controller 114 can send the request to the CPU 110 using command signal 220. CPU 110 may then correlate or map the identifier from the request for parametric data to a particular memory location in data memory 112 at which the requested parametric data is located. For example, CPU 110 may maintain a table that maps the identifier from the request for parametric data to a pointer register that is linked to the appropriate storage location in data memory 112.

Once CPU 110 receives the request for parametric data via command signal 220, CPU 110 can then send a memory read request to data memory 112 via signal 210. Host 102 may also send a memory address as part of a command or request to access parametric data. However, such a memory address sent by host 102 for such parametric data access may be ignored or otherwise interpreted by CPU 110 as something other than a memory address. For example, host 102 may correlate the sought-after parametric data to a location at a particular memory address of data memory 112, yet host 102 may remain unaware of the actual location at which that parametric data is stored. Such operation can accommodate legacy host systems in which the host is configured to request parametric data by its storage location(s). However, in typical embodiments, the optical transceiver (and not the host) may store and/or know the actual parametric data storage locations.

Once the request command, or a version or derivative thereof (e.g., a parametric data identifier), received on host communications interface 122 is sent to CPU 110 via command signal 220, CPU 110 can issue a read command on bus(es) 210 to data memory 112. As part of this process, CPU 110 can effectively translate information received from host 102 as part of the parametric data access request into an actual memory location that stores the sought after parametric data. As will be discussed in more detail below, pointers may be used to accomplish this translation or mapping operation. In any event, parametric data can be read from data memory 112 via memory output signal 222. Interface control register 208 can receive the requested parametric data, which may subsequently be provided to host 102 via host communications interface 122.

As discussed above, interface control register 208 may also be used to store the incoming identifier parsed or derived from the request for parametric data from host 102. In this case, register 208 may be wide enough (e.g., 32 bits, 64 bits, 128 bits, etc.) to accommodate such request information and outgoing parametric data information. Alternatively, separate registers (e.g., 16 bits, 32 bits, 64 bits, etc.) can be used to store incoming identifier information and outgoing parametric data. Further, various registers and storage locations discussed herein may also be lumped together in a same memory block or other storage structure.

Figure 3:
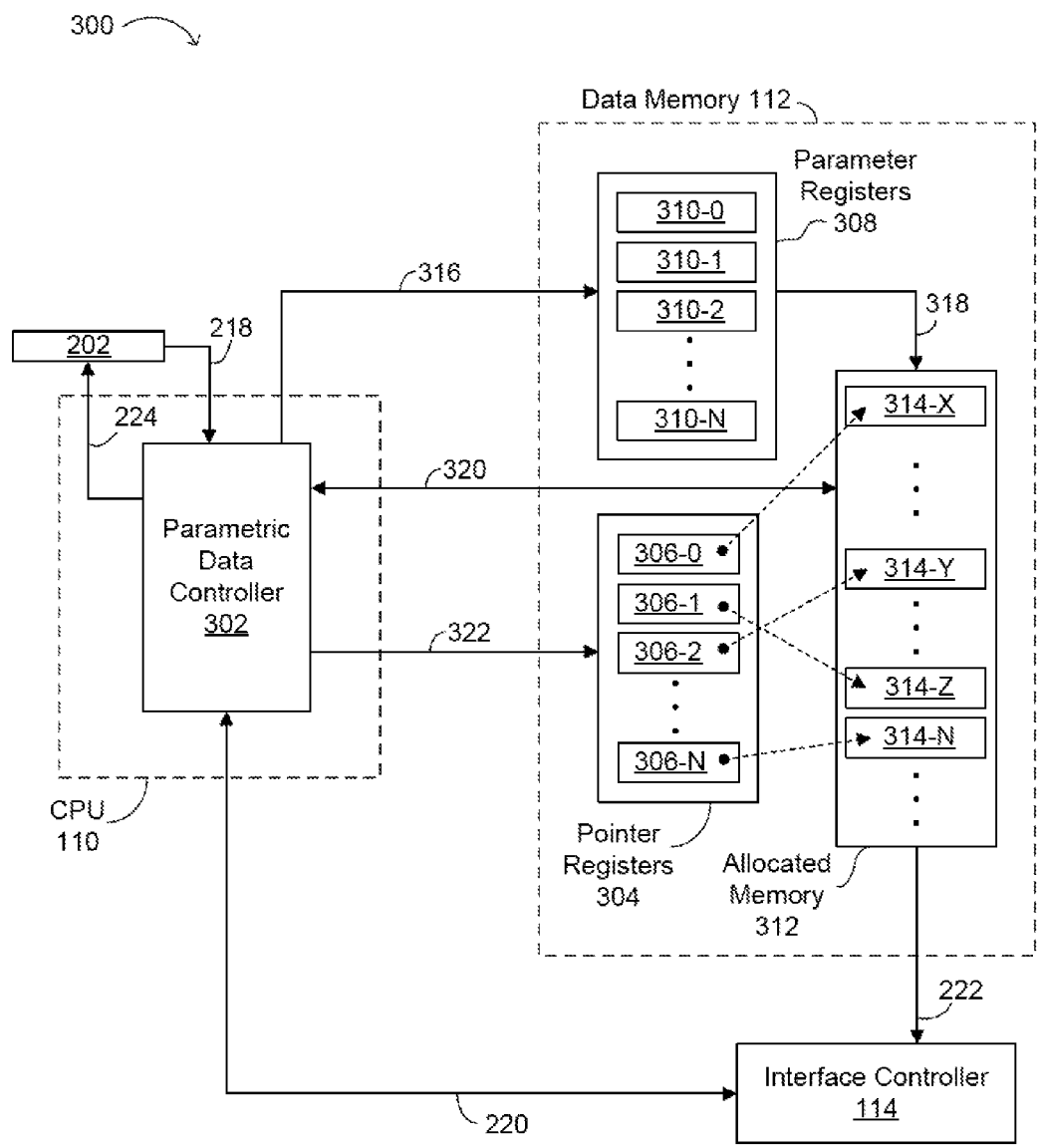
FIG. 3 is a block diagram showing an exemplary parametric data control structure in accordance with embodiments of the present invention.

FIG. 3 illustrates an exemplary parametric data control structure 300 in accordance with embodiments of the present invention. Parametric data controller 302 in CPU 110 can activate signal 224 to read the parametric data contents of ADC output register 202 on ADC output bus 218. Parametric data controller 302 can then write the accessed parametric data into parametric registers 308 via bus 316. For example, parametric registers 308 can include any number of registers (e.g., 310-0, 310-1, 310-2, ... 310-N, where N is an integer of 3 or more). As discussed above, ADC output register 202 may be implemented as a bank of registers instead of one register. For example, parameter registers 308 may form this bank of registers as a replacement for, or in addition to, the ADC output register 202.

Outputs 318 from parametric registers 308 can be supplied to an appropriate location 314 (e.g., 314-X, ... 314-Y, ... 314-Z, ... 314-N, ...) in allocated memory 312. Parametric data controller 302 can also set (e.g., via signal 322) a pointer 306 in pointer registers 304 (e.g., 306-0, 306-1, 306-2, . . . 306-N) to correspond with allocated memory location 314 (e.g., via signal 320). In this fashion, parametric data from ADC output register 202 can be stored in a location 314 in allocated memory 312. Further, location 314 can be subsequently accessed using a pointer 306 from pointer registers 304. Parametric data controller 302 can maintain pointer registers 304 corresponding to allocated memory 312. Parametric data controller 302 can also include a table that stores a location of a pointer 306 corresponding to a specific parameter. In this way, the identifier from the request for parametric data can be correlated or mapped to a particular memory location 314 in allocated memory 312 at which the requested parametric data is located. Data memory output may then be provided on bus 222 to interface controller 114 from the allocated memory 312 in response to a request via signal 220.

Any suitable register sizes (e.g., 8 bits wide, 16 bits wide, 32 bits wide, etc.), depending on CPU architecture, operating system, as well as other design considerations, etc., can be supported in particular embodiments. Also, any suitable formats (e.g., bit maps, unsigned/signed integers, IEEE floating point, etc.) for the registers can be supported in certain embodiments. Further, any suitable capacity (e.g., at least 2 kB, several kB, 16 kB, or higher) of data memory 112 can be supported in particular embodiments. Also, any suitable memory technologies or types of memories (e.g., flash memory, serial EEPROM, SRAM, DRAM, etc.) can also be supported in particular embodiments. In addition, cache memory 204 (see, e.g., FIG. 2) can represent a smaller and faster memory relative to a remaining portion of data memory 112. Various registers and/or allocated memory portions can be found or replicated within cache memory 204 to support faster accesses to parametric data that may be stored therein.

Figure 4A:
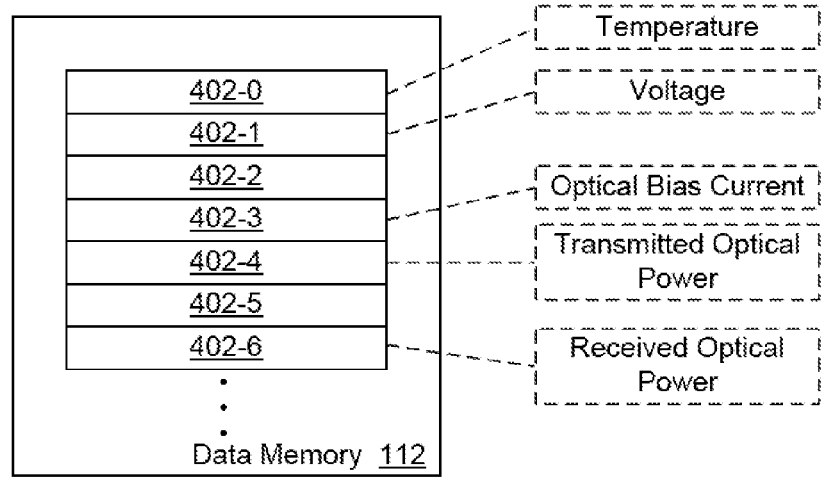
FIGS. 4A, 4B, and 4C are block diagrams showing exemplary dynamic memory maps for parametric data suitable for use in accordance with embodiments of the present invention.
Figure 4B:
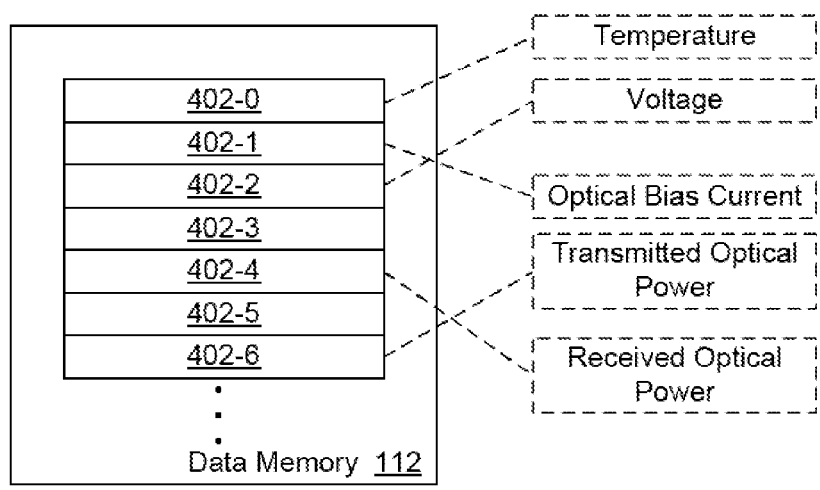
Figure 4C:
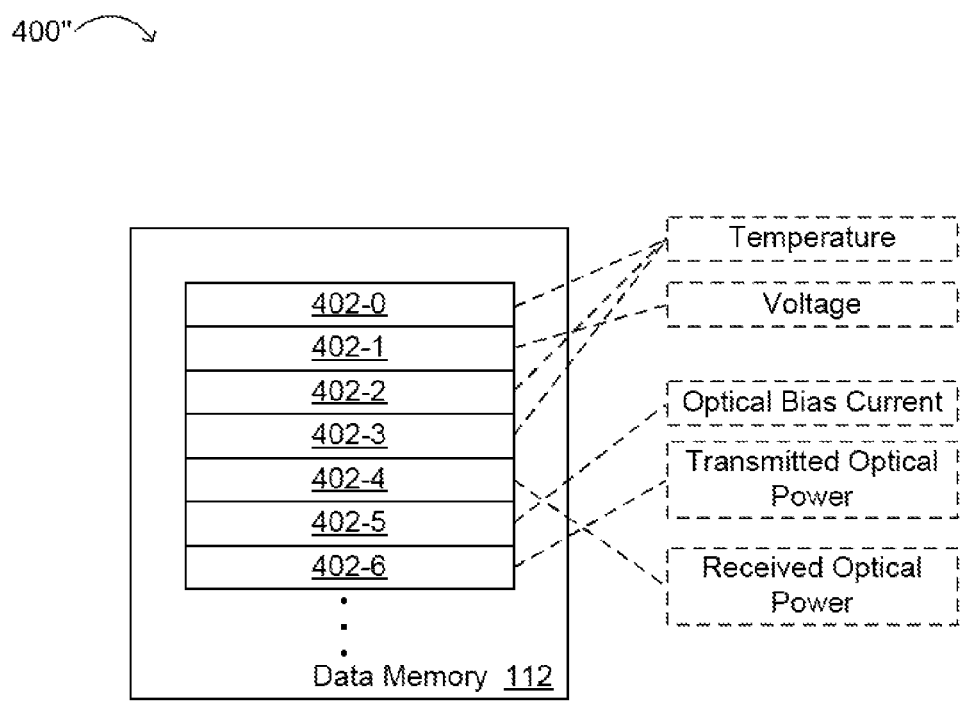

FIGS. 4A, 4B and 4C illustrate exemplary dynamic memory layouts or maps suitable for storing parametric data in accordance with embodiments of the present invention. Example 400 (FIG. 4A) shows various monitored parametric data related to operation of an optical transceiver, stored in various memory locations 402 of data memory 112. In this example, temperature data can be stored at memory location 402-0, voltage (e.g., supply voltage) data can be stored at memory location 402-1, optical or laser bias current data can be stored at memory location 402-3, transmitted or laser optical power data can be stored at memory location 402-4, and received optical power data can be stored at memory location 402-6. Memory locations 402-2 and 402-5 may be reserved for other data/information, or allocated in the future for new parametric data (e.g., new data for a new parameter or a previously monitored parameter).

In certain embodiments, parametric data can be allocated or re-allocated among suitable memory locations in a dynamic fashion. As shown in the example 400' (FIG. 4B), temperature data can be stored at memory location 402-0, voltage data can be stored at memory location 402-2, optical bias current data can be stored at memory location 402-1, transmitted optical power data can be stored at memory location 402-6, and received optical power can be stored at memory location 402-4. In the case where example 400' represents example 400 after a few cycles of receiving and storing new parametric data (e.g., parametric data updates), old or unnecessary parametric data can be either written over or allocated to a different memory location within data memory 112. Thus, as discussed herein, parametric data can be stored at any suitable dynamically allocated memory location.

As shown in the example 400" of FIG. 4C, certain parametric data may also be stored at more than one memory location 402 in data memory 112. For example, temperature data can be stored at memory locations 402-0, 402-2, and 402-3, while voltage data can be stored at memory location 402-1, optical bias current data can be stored at memory location 402-5, transmitted optical power data can be stored at memory location 402-6, and received optical power can be stored at memory location 402-4. The temperature data stored at memory locations 402-0, 402-2, and 402-3 may represent, e.g., different instances or samplings of the same temperature parameter. Such multiple instances or samplings of the same parameter can be used to calculate an average, a sum, or other result of a mathematical calculation (e.g., minimum/maximum determinations) performed on the parametric data stored in the multiple memory location(s). Alternatively, the temperature data stored at one memory location (e.g., 402-0) may represent a temperature of one component of the optical transceiver (e.g., the transmitter laser), while the temperature data stored at other memory location (e.g., 402-2, 402-3) may represent temperatures of other components of the optical transceiver (e.g., the receiver laser diode, the transmitter laser driver circuit, etc.), While the parametric data shown in FIGS. 4A, 4B, and 4C represent some examples of parametric data, any data related to optical transceiver operation can be accommodated in particular embodiments. For example, temperatures of multiple structures or units in optical transceiver 104, such as the temperature of the transmitting laser, a module, and/or a component in the optical receiver 118 can be stored and/or managed. Also for example, voltages of multiple structures, signals, or units in optical transceiver 104 can be stored and/or managed. In addition, power data can be stored and/or managed, including transmitter power, radio-frequency (RF) power and/or video power, such as transmitted optical digital power, received optical digital power, received optical video power, RF output power, and/or video output power. Further, other laser related data can also be stored and/or managed, such as laser output wavelength and/or optical output data frequency.

Functions or parameters related to operation(s) of the optical transceiver can also be changed over time. For example, data output from ADC 106 (e.g., at ADC output register 202) can be adjusted (e.g., by formula, calibration, re-programming, etc.) such that different data is accessed. Parameter registers 308, ADC output register 202, or other associated registers can also be re-programmed to change the information that is stored therein. Allocated memory 312 can also be de-allocated in whole or in part, with re-allocation accommodating different monitored parameters.

Exemplary Methods of Controlling Parametric Data Access

In one example, a method of controlling access to parametric data in an optical transceiver can include (i) scanning one or more memories in the optical transceiver to determine available data storage locations therein; (ii) dynamically allocating a location from the available data storage locations for storage of the parametric data, where the parametric data is for an operational parameter of the optical transceiver; and (iii) storing the parametric data in the one or more memories at the location. In another example, a method of accessing parametric data in an optical transceiver can include (i) receiving a request for the parametric data from a host, where the parametric data is for an operational parameter of the optical transceiver; (ii) translating an identifier from the request into a location in one or more memories in the optical transceiver at which the parametric data is stored, where the host is unaware of the location; and (iii) sending the requested parametric data to the host.

Figure 5:
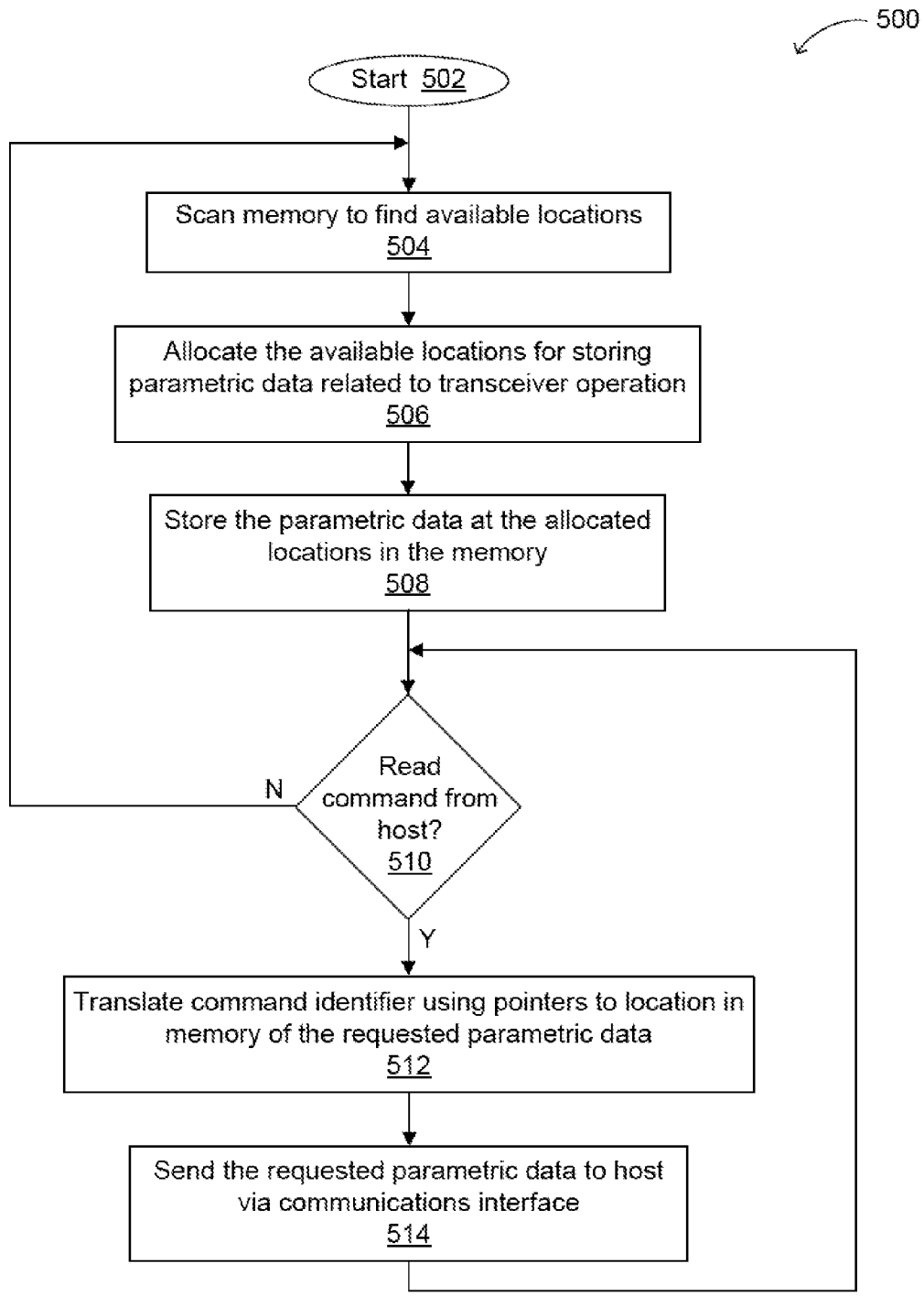
FIG. 5 is a flow diagram showing an exemplary method of allocating memory locations and controlling access to parametric data in accordance with embodiments of the present invention.

FIG. 5 illustrates an exemplary method 500 of controlling access to parametric data in accordance with embodiments of the present invention. The flow can begin at 502, and memory can be scanned to find available locations for parametric data storage (and optionally, for storage of pointers) at 504. For example, CPU 110 can scan data memory 112 to find such available locations. The available locations can be allocated for parametric data related to transceiver operation at 506. For example, allocated memory portions 312 can be determined from an overall scanned memory portion within data memory 112. Allocating memory locations may further include configuring a pointer register block (e.g., register block 304 in FIG. 3) to correlate certain pointer registers (e.g., registers 306-0 through 306-N) with corresponding parametric data (e.g., stored in allocated memory 312). For example, pointer register 306-0 can be configured to store the pointer for the location of a temperature of a particular component, pointer register 306-1 can be configured to store the pointer for the location of a voltage, pointer register 306-2 can be configured to store the pointer for the location of the transmitted optical power (e.g., laser output power), and pointer register 306-N can be configured to store the pointer for the location of the received optical power.

Referring back to the flow chart of FIG. 5, at 508, parametric data is then stored at the allocated locations in the memory. For example, parametric data can be transferred from parametric registers 308 (or ADC output register 202) in FIG. 3 to an allocated location in allocated memory 312, and the addresses of the allocated locations can be stored in the pointer registers 306-0, 306-1, 306-2, . . . and/or 306-N corresponding to the parameter for which the data were obtained. Thus, pointers 306-0, 306-1, 306-2, . . . 306-N in pointer registers 304 can be utilized to subsequently find corresponding locations of stored parametric data in allocated memory 312.

If, at 510, no request for parametric data (e.g., a read command) from a host is received, the flow returns to 504 to scan for available memory locations. Thus, continued parameter monitoring, accesses within the optical transceiver, and storage of the parametric data at allocated memory locations, may occur until a request for such data is received from the host at 510. Once a request for parametric data is received from the host at 510, a command identifier or other information from the host request may be translated or correlated at 512 using the pointer(s) to the appropriate location in the allocated memory of the requested parametric data. For example, parametric data controller 302 in FIG. 3 can send a signal 322 to pointer registers 304 to match an appropriate pointer 306-0, 306-1, 306-2, . . . or 306-N corresponding to the requested data in allocated memory 312.

Referring back to FIG. 5, at 514, the requested parametric data may then be retrieved from allocated memory 312 and sent to the host via a communications interface, and the flow 500 may return to 510 determine if there is another read command from the host. For example, referring to FIG. 3, pointer register 306-2 can be used to determine that the requested parametric data is found at allocated memory location 314-Y. This data can then be supplied to interface controller 114 via memory output 222, and then sent from interface controller 114 to host 102 via the host communications interface 122. Once another request for parametric data is received from the host at 510 (FIG. 5), this request can similarly be translated at 512 to access new parametric data from the allocated memory. However, if there is no pending request for parametric data from the host at 510, the flow may return to 504 to scan the available memory (e.g., in data memory 112) to find available locations. In further embodiments of the flow 500, both of the upper loop 504, 506, 508 and 510 can operate simultaneously and/or continuously with the lower loop 510, 512 and 514.

As discussed above, the rates at which the memory is scanned and data is stored at allocated memory locations, as compared to the rates at which read commands are received from the host and requested parametric data is sent in response to the host, are variable in particular embodiments. For example, the flow including 504, 506, and 508 can occur at one rate, while the flow including 510, 512, and 514 can occur at a different rate. Thus, parametric data can be stored in allocated memory at a rate that is independent of the rate at which a host requests such data. Alternatively, such to rates may be the same, such as when parametric data is obtained on demand based on requests for the parametric data.

Exemplary Software

The present invention also includes algorithms, computer program(s) and/or software, implementable and/or executable in an embedded device, such as a network switch, router, etc., or a general purpose computer or workstation equipped with a conventional digital signal processor, configured to perform one or more steps of the method and/or one or more operations of the hardware. Typically, in the present disclosure the host is such an embedded device. Thus, a further aspect of the invention relates to algorithms and/or software that implement the above method(s). For example, the invention may further relate to a (non-transitory) computer program or computer-readable medium containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any (non-transitory) medium that can be read by a processing device configured to read the medium and execute code stored thereon or therein, such as a floppy disk, CD-ROM, magnetic tape or hard disk drive. In some embodiments, the part or parts of the software and/or algorithm(s) that reside in the host may be included in general purpose computer software (e.g., a driver), encoded and/or stored on such a medium. Such code may comprise object code, source code and/or binary code.

In the present disclosure, the code is generally configured for transmission through an appropriate medium, such as copper wire, a conventional twisted pair wireline, a conventional network cable, a conventional optical data transmission cable, or even air or a vacuum for wireless signal transmissions, as are signals generated in accordance with the code or with hardware executing the code. The code for implementing the present method(s) is generally digital, and is generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium comprises at least one instruction to (i) scan one or more memories in the optical transceiver to determine available data storage locations therein; (ii) allocate a location from the available data storage locations for storage of the parametric data, where the parametric data is for an operational parameter of the optical transceiver; and (iii) store the parametric data in the one or more memories at the location. The computer-readable medium may further comprise at least one instruction to store a pointer or address of the location of stored parametric data in a predetermined location corresponding to the parameter for which the data were obtained.

In further embodiments, the computer-readable medium comprises at least one instruction to (i) receive, recognize or process a request for the parametric data from a host, where the parametric data is for an operational parameter of the optical transceiver; (ii) translate an identifier in or from the request into a location in one or more memories in the optical transceiver at which the parametric data is stored; and (iii) send the requested parametric data to the host. In general, the host is unaware of the location at which the parametric data is stored.

While the above examples include particular implementations of registers and other memory arrangements, one skilled in the art will recognize that other technologies and arrangements may also be used in accordance with embodiments. For example, data access using tagging techniques other than pointers can be used in certain embodiments. Further, one skilled in the art will recognize that other forms of signaling and/or control (e.g., current-based signaling, flag-based signaling, differential signaling, etc.) may also be used in accordance with various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transceiver, comprising:
    a) an optical receiver configured to receive optical data;
    b) an optical transmitter configured to transmit optical data;
    c) a microprocessor configured to access data for each of a plurality of parameters that are related to operation of at least one of said optical receiver and said optical transmitter;
    d) one or more memories configured to store said data at a plurality of locations that are dynamically allocated by said microprocessor; and
    e) an interface configured to (i) receive a request for data for one or more of said parameters from a host and (ii) provide said data in response to said request, wherein said host is unaware of said locations in said one or more memories at which said data are stored.

2. The optical transceiver of claim 1, wherein said locations is are dynamically allocated by said microprocessor during normal operation.

3. The optical transceiver of claim 1, further comprising one or more analog-to-digital converters (ADCs) coupled to said optical transmitter and said optical receiver, wherein said one or more memories comprises a plurality of registers corresponding to said one or more ADCs, and each of said registers is configured to store data for one of said parameters.

4. The optical transceiver of claim 1, wherein said one or more memories comprises a volatile data storage memory configured to store data for all of said plurality of parameters.

5. The optical transceiver of claim 1, wherein said microprocessor accesses said location(s) of said data in response to said request from said host.

6. The optical transceiver of claim 1, wherein said parameters comprise at least two members of the group consisting of temperature of laser, temperature of module, temperature of optical receiver, voltages, optical bias current, transmitted optical digital power, received optical digital power, received optical video power, radio-frequency (RF) output power, and laser wavelength.

7. The optical transceiver of claim 1, wherein said microprocessor is configured to scan said one or more memories to determine available locations for storage of said data.

8. The optical transceiver of claim 1, wherein said microprocessor is configured to translate a command identifier from said host into a corresponding location in said one or more memories using a pointer.

9. The optical transceiver of claim 8, further comprising a pointer register configured to store said pointer when said microprocessor dynamically allocates said corresponding location.

10. An optical triplexer, comprising the optical transceiver of claim 1.

11. A method of controlling access to parametric data in an optical transceiver, the method comprising:
    a) scanning one or more memories in said optical transceiver to determine available data storage locations therein;
    b) dynamically allocating a location from said available data storage locations for storage of said parametric data, wherein said parametric data is for an operational parameter of said optical transceiver; and
    c) storing said parametric data in said one or more memories at said location.

12. The method of claim 11, wherein said location is dynamically allocated by a microprocessor in said optical transceiver during normal operation.

13. The method of claim 11, further comprising storing a pointer to said location in a register after said location is allocated.

14. The method of claim 13, wherein:
    a) said parametric data is an output of an analog-to-digital converter (ADC);
    b) said one or more memories comprises a register receiving said output of said ADC; and
    c) said pointer indicates said register as said location in said one or more memories at which said data are stored.

15. A method of accessing parametric data in an optical transceiver, the method comprising:
    a) receiving a request for said parametric data from a host, wherein said parametric data is for an operational parameter of said optical transceiver;
    b) translating an identifier from said request into a location in one or more memories in said optical transceiver at which said parametric data is stored by a process comprising accessing a pointer from a register, said pointer corresponding to said location, said host being unaware of said location;
    c) storing said pointer in said register when said location is allocated from a plurality of available data storage locations in said one or more memories; and
    (d) sending said requested parametric data to said host.

16. The method of claim 15, further comprising accessing said parametric data at said location after receiving said request for said parametric data from said host and prior to sending said requested parametric data to said host.

17. The method of claim 15, wherein said parametric data is an output of an analog-to-digital converter (ADC), said one or more memories comprises an output register receiving said output of said ADC, and said pointer indicates said output register as said location in said one or more memories at which said data are stored.

18. The method of claim 17, wherein said output of said ADC is stored in said register when a request for said data is received from said host.

19. A system for accessing parametric data, the system comprising:
  a) an optical transceiver configured to transmit and receive optical data, wherein said optical transceiver comprises a microprocessor and a memory, said microprocessor being configured to access said parametric data, and said memory being configured to store said parametric data at one or more locations that are dynamically allocated by said microprocessor; and
  b) a host configured to provide a request to said optical transceiver for said parametric data and receive said parametric data from said optical transceiver in response to said request, wherein said parametric data is related to one or more operations of said optical transceiver, and said host is unaware of said one or more locations in said one or more memories at which said parametric data are stored.

20. The system of claim 19, wherein said optical transceiver further comprises an analog-to-digital converter (ADC), said ADC having a register configured to store said parametric data prior to said parametric data being stored in said one or more memories.

21. The system of claim 19, wherein said parametric data comprises data for at least two members of the group consisting of temperature of laser, temperature of module, temperature of optical receiver, voltages, optical bias current, transmitted optical digital power, received optical digital power, received optical video power, radio-frequency (RF) output power, and laser wavelength.

22. The system of claim 19, wherein said microprocessor is configured to translate a command identifier from said host into a corresponding one of said one or more locations in said one or more memories using a pointer.

23. The optical transceiver of claim 9, wherein said microprocessor is configured to translate a plurality of command identifiers from said host into a plurality of corresponding locations in said one or more memories using a plurality of corresponding pointers, and said pointer register stores each of said plurality of pointers when said microprocessor dynamically allocates said corresponding locations.

24. The system of claim 22, wherein said microprocessor is configured to translate a plurality of command identifiers from said host into a plurality of corresponding locations in said one or more memories using a plurality of corresponding pointers, and said system further comprises a pointer register configured to store said plurality of pointers when said microprocessor dynamically allocates said corresponding locations.

* * * * *